United States Patent [19]

Smith

[11] 3,848,899

[45] Nov. 19, 1974

[54] PNEUMATIC SWIVEL ASSEMBLY

[75] Inventor: Jack Edward Smith, Whittier, Calif.

[73] Assignee: Dumont Aviation Associates, Lakewood, Calif.

[22] Filed: Feb. 16, 1973

[21] Appl. No.: 333,132

[52] U.S. Cl. .................... 285/98, 285/167, 285/263

[51] Int. Cl. .................... F16l 17/00

[58] Field of Search ............ 285/167, 261, 263, 98, 285/266, 267, 268, 269, 270, 271

[56] References Cited

UNITED STATES PATENTS

| | | | |
|---|---|---|---|
| 1,561,033 | 11/1925 | Spencer | 285/167 |
| 1,782,484 | 11/1930 | Spencer et al. | 285/167 |
| 1,804,810 | 5/1931 | Reedy | 285/271 X |
| 2,424,897 | 7/1947 | Orshansky | 285/266 X |
| 2,467,370 | 4/1949 | Christensen | 285/98 |
| 2,473,502 | 6/1949 | Bord | 285/271 X |
| 2,864,630 | 12/1958 | Breitenstein | 285/261 |
| 3,165,339 | 1/1965 | Foccou | 285/263 |
| 3,314,697 | 4/1967 | Freeman | 285/263 |
| 3,712,645 | 1/1973 | Herter | 285/167 |

*Primary Examiner*—Dave W. Arola
*Attorney, Agent, or Firm*—Alan C. Rose

[57] ABSTRACT

A fluid swivel housing assembly having a unique ball-rotator shape is described allowing greater angular movement of fluid conduits. The ball-rotator shape is generally spherical in its outside configuration and so shaped on its interior surface that no restriction in fluid passage is presented upon angular misalignment of the swivel.

2 Claims, 4 Drawing Figures

PNEUMATIC SWIVEL ASSEMBLY

BACKGROUND OF THE INVENTION

It has been known before to provide fluid, primarily hydraulic conduit joints which permit angular movement of the joined conduits relative to their normal axes, such as is taught, for example, by Bayles in U.S. Pat. No. 445,153. Such devices, however, mandatorily restrict the normal fluid passageway diameter when the conduits are swiveled relative to the assembly and angularly to each other. Further, in devices presently available such as Bayles, only approximately 14° of angular movement is obtainable. Known and presently available swivel joints, as represented by Bayles, are rigid in their structure. Moreover, there is no movement of the conduits to be swiveled relative to the swivel housing, as such an arrangement would necessarily allow fluid leakage if the housing were loosened to allow for angular movement. Simple swivel devices having greater conduit angular misalignment capabilities relative to the swivel housing and to other thereto fluidically connected conduits without diminishing the fluid passageway within the swivel housing have been greatly desired. Thus, it is the object of the present invention to increase the angular misalignment of fluidically connected conduits in a fluid-tight swivel housing allowing up to 60° angular misalignment while providing coincidental, rotational movement of the conduits within the housing. Further, it is an object of the present invention to provide increased angular movement within a swivel assembly without diminishing the fluidic passageway therein.

SUMMARY OF THE INVENTION

A swivel assembly for joining rotatable conduits is shown having a housing assembly and two conduits with spherically shaped flared ends held within the housing assembly. The spherically shaped flared ends are disposed preferably on a ball-rotator and movably secured within a housing assembly so that optimum angular movement of the conduits relative to each other is achieved. One aspect of the invention is the provision of a ball-rotator with carefully calculated size relative to the passageways so that no impediment, hindrance or obstruction is presented to fluid passage. Another aspect of the invention is the provision of an annular ring and bearing assembly allowing 360° rotation with angular misalignment of the conduits.

Figure 1:
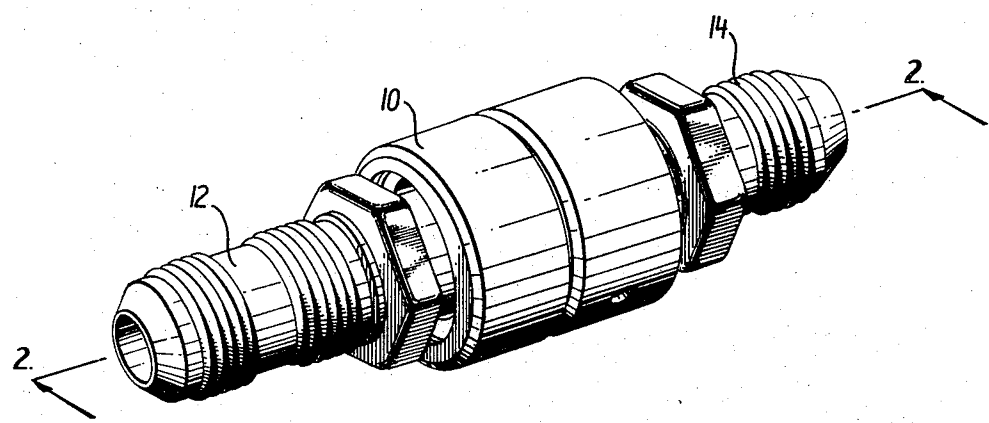
FIG. 1 illustrates a prospective view of the present invention.

DESCRIPTION OF THE PREFERRED EMBODIMENT:

To achieve the aforementioned purposes, a swivel 10 having a housing is provided, reference being had to FIG. 1. Conduits 12, 14 are shown entering the housing 10 at openings 16, 18, respectively, shown more clearly in FIG. 2. The conduits 12, 14 are shown having generally cylindrical interiors or fluid passageways, and flared ends 20, 22. The flared ends 20, 22 are spherical in shape as to exterior and interior surfaces thereof.

The interior surfaces of the flared ends 20, 22 rest upon a ball-rotator 24, which is spherical on its outside surface for complemental engagement with the ends 20, 22. The ball-rotator 24 has an interior with openings to the conduits 12, 14. The ball-rotator or rotator element 24 has lips 26 at the openings thereof. The lips 26 are thin relative to the remainder of the ball-rotator 24 so as to be flexible under pressure. The lips 26 conform on their outer surfaces to extend the spherical shape of the surface of the ball-rotator or rotator element 24. Thus in the embodiment shown, when the lips 26 are under fluid pressure from within the conduits and swivel, the lips 26 extend slightly to sealably engage the flared ends 20, 22.

The ball-rotator or rotator element 24 is constructured under the preferred embodiment using extremely low friction material. Thus, even though the lips 26 may be under pressure from fluid within the passageways and within the ball-rotator or rotator element 24 so that the lips 26 seal the passageways from the swivel housings, the ball-rotator 24 freely moves within the flared ends 20, 22. The ball-rotator 24 moves responsive to an annular ring 30 which is fixed into the exterior surface of the ball-rotator 24 for engagement with the edges of the flared ends 20, 22. The purposes and functions of this annular ring 30 will be described in more detail below.

Figure 2:
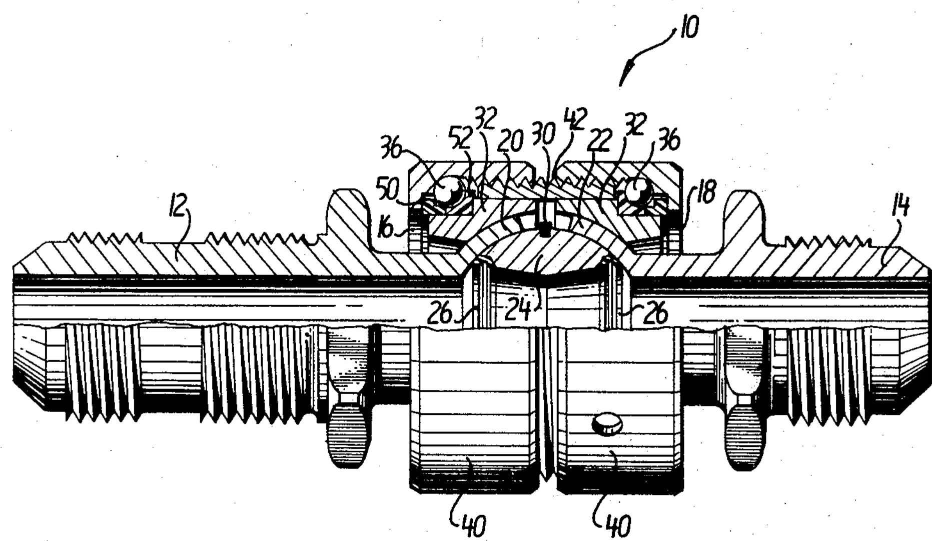
FIG. 2 illustrates a side elevational, fragmentary view of the preferred embodiment of the present invention.
Figure 3:
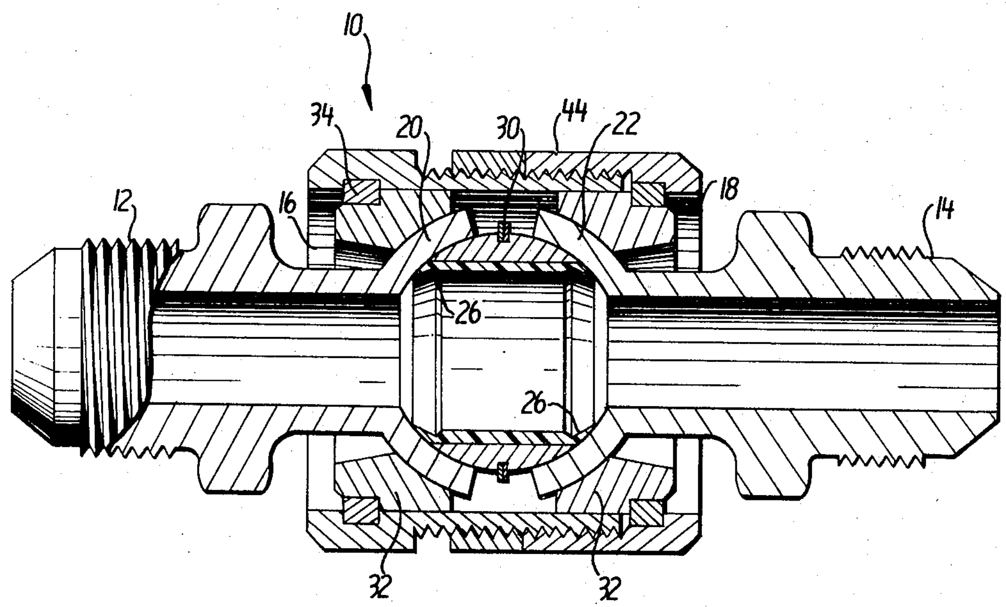
FIG. 3 illustrates a side elevational, fragmentary view of an alternative embodiment of the present invention.

The flared ends 20, 22 of the conduits 12, 14 are movably secured on their exterior surfaces by and within the housing assembly 10. As shown in both the preferred embodiment of FIG. 2 and the alternative embodiment of FIG. 3, the flared ends 20, 22 are engaged by annular bearing races 32 shaped spherically so as to provide a substantially close and complemental fit with the spherical shape of the exterior surfaces of the flared ends 20, 22. The annular bearing races 32 have an inner diameter relative to the axis of the conduit passageways less than that of the edges of the flared ends 20, 22 so that the conduit flared ends are securely, although movably maintained within the housing 10. The bearing races 32 can be secured within the housing 10 with split rings 34 if desired, as shown in FIG. 3. The preferred embodiment, however, is as shown in FIG. 2 wherein the bearing races 32 are secured movably within housing 10 by the interpositioning of ball bearings 36. Thus, it would be possible under anticipated housing pressures for the bearing races 32 and conduit joint to rotate a full 360° within the housing assembly 10 about the housing assembly axis.

The housing assembly 10 may include the two nuts 40 engaging oppositely wound screw threads over threaded body 42, as shown in FIG. 2. Alternatively, a single nut 44 can selectively engage a threaded body 46, as is shown in FIG. 3. In either embodiment, tightening of the nuts 40 or nut 44 will reduce the freedom of movement within housing 10. In those housings 10 which are not fitted with ball bearings 36, the freedom of movement, both angularly and rotationally, can be frozen selectively as desired.

The openings 16, 18 in the housing nuts 40, or nut 44 and body 46 preferably should be sufficiently large so as to allow the flared ends 20, 22 of the conduits 12, 14 to pass therethrough without difficulty when the bearing races 32 are removed.

If desired, sealing split rings, such as shown as elements 50 and 52 may be employed, although they are theoretically unnecessary for sealing purposes, as will be described and shown below. Such rings 50, 52 may be necessary, of course, to contain ball bearing 32 if they are desired.

Figure 4:
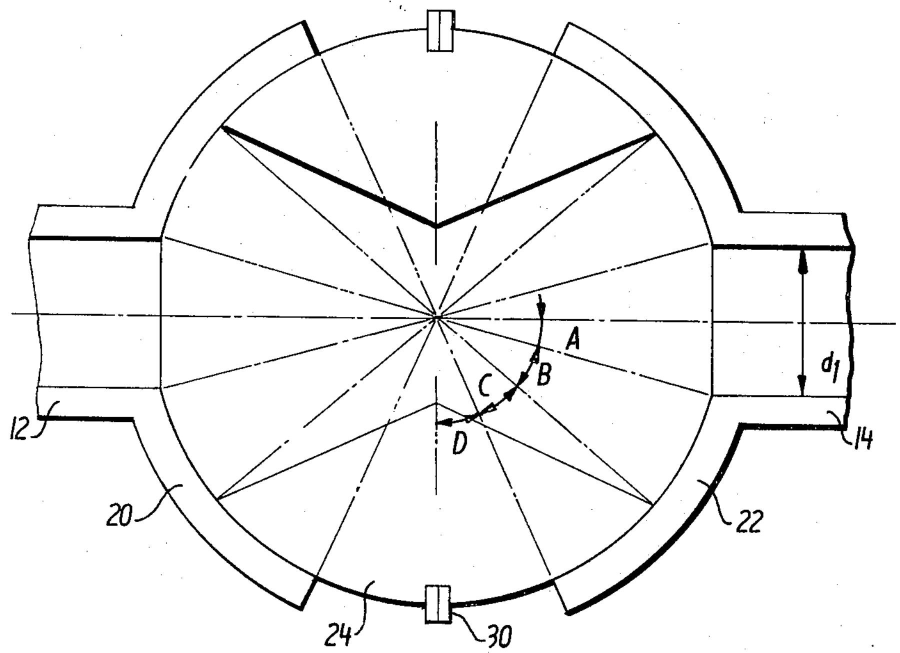
FIG. 4 is a diagrammatic showing of a schematic of the present invention.

Obviously, there is an optimum relationship between the diameters of the conduit passageway and the ball-rotator surface. In the follwoing analysis of this relationship, the angle A is the angle subtended by the conduit 14 radius from the center of the ball-rotator 24; the angle B is the angle subtended from angle A to the edge of the lips of the ball-rotator 24, and thus indicates the angle through which the ball or element 24 may be rotated without obstructing the conduit; the angle C is the angle of overlap of the conduit flared end 22 and the ball-rotator surface when the ball-rotator 24 and and conduits 12, 14 are coaxial; and, the angle D is the clearance angle between the edge of the conduit flared end 22 and the annular ring 30 at the center of the rotator element 24. All of these angles are shown in FIG. 4.

Now, the maximum turn capability of the swivel design without passageway impedance may be determined according to the formulas for angular swivel or misalignment:

$$2D = \text{maximum turn} \quad (1)$$

$$A + B + C + D = 90° \quad (2)$$

$$\text{but } B = C = D \quad (3)$$

$$\therefore A + 3D = 90° \quad (4)$$

$$d = 90° - A/3 \quad (5)$$

$$2D = 2\ (90° - A/3) \quad (6)$$

$$\text{if } A = 0,\ 2D = 60°;\ D = 30° \quad (7)$$

$$\text{if } A - 90°,\ 2D = 0° \quad (8)$$

The limiting cases involve a very small conduit diameter, in which case the angle *A* would approach zero, or a very large conduit relative to the diameter of the ball, in which case the angle *A* would approach 90°. Of course, if $A = 0$, there would be no passageway. On the other hand, if $A = 90°$, then there would be no angular swivel or turn capability. As indicated by Equation 7 above, if the conduit is very small relative to the ball-rotator diameter, each conduit could rotate nearly 30° relative to the ball, and could rotate nearly 60° relative to the other conduit.

It is possible to have as an alternative embodiment the provision of a ball-rotator having a spherically shaped interior surface to complementally fit into the outside surface of the flared ends 20, 22.

The present invention when assembled as shown in FIG. 2 can be better understood when manner of operation is seen. In operation, fluid passing through the conduits exerts sufficient pressure on the pressure sensitive ball-rotator or element lips 26 so as to firmly seal the joint, passageways and openings for fluid escape into the housing 10. If desired, split rings 50, 52 or split rings 34 can be inserted to further ensure that no fluid escapes the housing assembly 10. As mentioned, however, it is felt that under ordinary conditions, the fluid pressure within the passageway exerted on lips 26 should prevent fluid escaping either into the housing assembly 10, or beyond.

If while fluid pressure is being applied through the passageways, external forces rotate conduits 12, 14 about their axes within the housing, the ball bearing assembly 36 will permit such rotation with ease. The provision of ball bearings 32 is completely optional.

Of course, external forces may also move the conduits 12, 14 angularly relative to the axis of the housing assembly 10. When a conduit 12, for example, moves angularly an angular distance *D* relative to the axis of housing assembly 10, one edge of the flared end 20 will ordinarily engage annular ring 30. As conduit 12 continues to so angularly move, the annular ring 30 is forceably moved, in turn rotating ball-rotator or rotator element 24. The angular distance between the edge of flared end 20 and the annular ring 30 is equal to the angle *D* (see FIG. 4) when the conduit 12 and ball-rotator or element 24 are axially aligned with housing 10. The angular distances *B* and *C* are identical to angle *D* if the ball-rotator is to be prevented from restricting the fluid passageways during maximum angular misalignment with the ball-rotator on its opposite side simultaneously maintaining the fluid passageway fluid tight. Thus, the lips 26 are prevented from ever restricting the passageways, nor will they be separated from the flared ends 20, 22 so as to allow fluid to escape to within the housing 10. The maximum angle which conduit 12 may move is defined by the movement of flared end 20, and annular ring 30 striking the oppositely disposed conduit 14 at the edge of its flared end 22. The angular distance between the edges of flared ends 20 and 22 when the conduits are axially aligned with the housing assembly 10 is precisely set at angle 2*D* so that lips 26 may never be capable of restricting the passageways.

By tightening nuts 40 in the embodiment shown in FIG. 2 or nut 44 in the embodiment shown in FIG. 3, the misalignment of conduit 20, 22 relative to each other relative to the ball-rotator 24 and relative to the housing assembly 10 can be dampened. If the ball bearings 36 are not employed, all movement within the housing 10 of the conduits 12, 14 can be frozen, if desired, by the consequent pressure upon the bearing races 32. By loosening the same nuts 40, 44 to any degree desired, the freedom of movement can be selectively varied and predetermined.

If can be seen by the foregoing description that by the apparatus so described, a non-restrictive, high-misalignment coupling can be achieved.

I claim.

1. A swivel assembly for joining a plurality of fluid conduits comprising:

a. housing assembly means having first and second openings therein and including means adapted to movably engage and retain said conduits in adjacent relationship;

b. a first conduit including an inner fluid passageway diameter and including a first end comprising a partially spherical shape flared radially from an axis of said first conduit, said first spherically shaped end further comprising an annular edge, said first end selectively movably mounted within said housing assembly means;

c. a second conduit including an inner fluid passageway diameter and including a second end comprising a partially spherical shape flared radially from an axis of said second conduit, said second spherically shaped end further comprising an annular edge, said second end selectively movably mounted within said housing assembly means;

d. a ball-rotator comprising a concentric surface spherically complemental to a surface of said first and said second spherically shaped flared ends and in engagement therewith, said ball-rotator further including two annular lips having a diameter substantially larger than said inner diameter of and adjacent of said conduits, each of said lips disposed in movable, fluid sealing contact with a respective flared end of said first and said second conduits said ball-rotator having a bore therethrough with a minimum diameter at least as large as said passageway diameters, said annular lips and said bore defining a passageway in pneumatic coupling relationship with said first conduit and said second conduit;

e. said ball-rotator having an annular ring including an axis, and being mounted on said spherical surface engageable with the annular edge of said first flared end and of said second flared end; and f. said annular edge of said first flared end, said annular ring and one of said annular lips having a predetermined angular relation when the axes of said first conduit and of said annular ring are coincidental, the angular relation being that the angular distance from said annular ring to the said first spherically shaped end annular edge substantially equaling the angular distance from said first spherically shaped end annular edge to said annular lip disposed in contact with said first conduit flared end, and further substantially equaling the angular distance from saId annular lip to the end of said first conduit inner diameter whereby upon maximum misalignment of either conduit relative to said ball-rotator, the inner diameter of said conduit is not constricted by said ball-rotator.

2. A swivel assembly as claimed in claim 1 having a maximum misalignment of said first conduit to said second conduit of approximately less than 60° without constriction of the said inner diameter of either of said conduits.

* * * * *